United States Patent Office 3,086,014
Patented Apr. 16, 1963

3,086,014
16,16-DIFLUORO ESTROGENS
Albert Bowers and Pierre Crabbé, Mexico City, Mexico, assignors, by mesne assignments, to Syntex Corporation, a corporation of Panama
No Drawing. Filed Mar. 1, 1962, Ser. No. 176,824
19 Claims. (Cl. 260—239.55)

The present invention relates to novel cyclopentanophenanthrene derivatives and to a process for the production thereof.

More particularly the present invention relates to novel 16,16-difluoro-9,11-oxido-$\Delta^{1,3,5,(10)}$ - estratriene,16,16 - difluoro - $\Delta^{1,3,5,(10),8}$ - estratetraen - 11$\beta$ ol and 16,16-difluoro - $\Delta^{1,3,5(10,)8}$ - estratetraen-11-one derivatives.

The novel compounds of the present invention are represented by the following formulas:

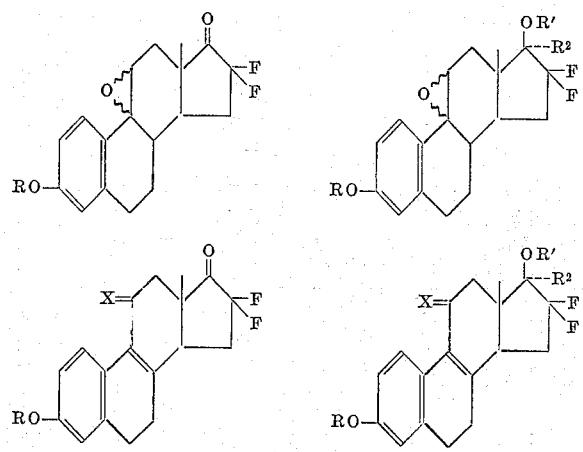

In the above formulas X represents keto or $\beta$-hydroxyl; R may be hydrogen, lower alkyl or a hydrocarbon carboxylic acyl group of less than 12 carbon atoms; $R^1$ represents hydrogen or a hydrocarbon carboxylic acyl group of less than 12 carbon atoms; $R^2$ may be hydrogen, lower alkyl, lower alkenyl or lower alkynyl. The wavy lines of the 9,11-oxide group indicate that the said group may be in the 9$\alpha$,11$\alpha$ or 9$\beta$,11$\beta$-steric configuration.

The acyl groups are divided from hydrocarbon carboxylic ocids containing less than 12 carbon atoms which may be saturated or unsaturated, of straight, branched, cyclic or cyclic-aliphatic chain, aromatic and may be substituted by functional groups such a hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formulas exhibit negligible estrogenic activities but are very valuable in arresting calcium excretion in certain bone diseases such as osteoporosis. In addition they lower the blood and adrenal cholesterol level, are useful in the treatment of artheosclerosis and reduce abnormal bleeding considerably, for example, hemorrhages after dental extractions and tonsillectomies.

The novel compounds of the present invention are prepared by the process exemplified as follows:

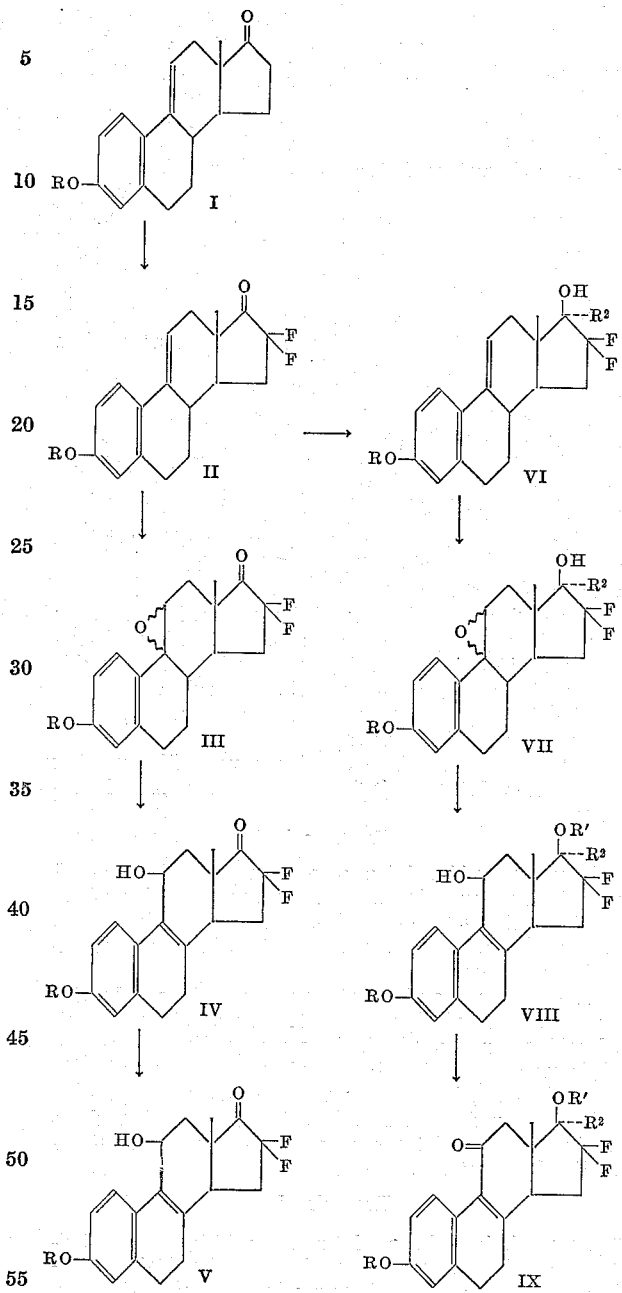

In the above formulas R, $R^1$ and $R^2$ have the same meaning as previously described.

In practicing the process outlined above, the starting compound (I) which is selected from the group consisting of $\Delta^{9(11)}$-dehydro estrone, the 3-lower alkyl ethers and the 3-acylates thereof, is treated with ethyl formate in the presence of sodium methoxide to produce the corresponding 16-hydroxymethylene derivative which upon reaction with perchloryl fluoride in a suitable solvent such as ter-butanol, in the presence of potassium terbutoxide yields the corresponding 16,16-difluoro-$\Delta^{9(11)}$- dehydro estrone compound (II).

The latter 16,16-difluoro-17-keto compound ((II) is treated with a lower alkyl mangnesium halide in an inert solvent, thus affording the corresponding 17α-lower alkyl-17β-alcohol (VI; $R^2$=lower alkyl). The same 16,16-difluoro-17-ketones (II) upon reaction with a 1-lower alkine such as acetylene in the presence of potassium ter-amyloxide, yield the corresponding 17α-lower alkynyl-17β-alcohols (VI: $R^2$=lower alkynyl) which are hydrogenated in the presence of a suitable catalyst such as 2% palladium on calcium carbonate to give the corresponding 17α-lower alkenyl-17β-alcohols (VI; $R^2$=lower alkenyl).

The 16,16-difluoro-$\Delta^{9(11)}$-17-ketones (II) are reduced preferably with sodium borohydride in order to produce the 17α-unsubstituted 17β-alcohols (VI; $R^2$=H).

The 16,16-difluoro-$\Delta^{9(11)}$-17-ketones (II) and 16,16-difluoro-$\Delta^{9(11)}$17β-alcohols with a hydrogen, lower alkyl or lower alkynyl at C-17α (VI), upon reaction with an organic peracid such as monoperphthalic acid yield the corresponding 9α,11α-oxides and the corresponding 9β,11β-oxides (III and VII). The 9β,11β-oxido compounds are treated with hydrogen bromide in a suitable solvent such as chloroform, to produce the corresponding 9α-bromo-11β-hydroxy derivatives which upon dehydrobromination with a convenient agent such as calcium carbonate in dimethylformamide yield the corresponding $\Delta^8$-11β-alcohols (IV and VIII). The latter $\Delta^8$-11β-alcohols are oxidized preferably with Jones reagent to give the 11-keto derivatives (V and IX).

When there is present a 17β-secondary hydroxyl ($R^2$=H) the $\Delta^8$-11β,17β-diols are first selectively acylated in pyridine with an acylating agent, such as acetic anhydride, at 0° C., to give the corresponding 17β-acylates which thereafter are oxidized to the 11-ketones as previously set forth.

The tertiary 17β-alcohols of the present invention are conventionally acylated in the presence of p-toluene-sulfonic acid with an acylating agent such as an anhydride derived from a hydrocarbon carboxylic acid of the type hereinbefore set forth, thus affording the corresponding 17α-substituted 17β-acylates.

The following specific examples serve to illustrate but are not intended to limit the scope of the present invention:

*Example I*

There was added 1.4 g. of sodium methoxide and 1.9 ml. of anhydrous ethyl orthoformate to a solution of 1.9 g. of 3-methoxy-$\Delta^{9(11)}$-dehydroesterone (Magerlein et al., J. Am. Chem. Soc. 80, 2220 (1958)), in 40 ml. of anhydrous benzene.

The mixture was stirred at room temperature and under an atmosphere of nitrogen for 15 hours. Then 200 ml. of cold water was added, the strongly alkaline aqueous phase was separated and acidified with an excess of 10% hydrochloric acid solution; the precipitate formed was collected, washed and dried. Recrystallization from methanol afforded 3 - methoxy - 16 - hydroxymethylene-$\Delta^{9(11)}$dehydroestrone.

*Example II*

To a solution of 3 g. of 3-methoxy-16-hydroxymethyl-ene-$\Delta^{9(11)}$-dehydroestrone in 100 ml. of anhydrous ter-butanol was added 40 ml. of a solution of potassium ter-butoxide (prepared from 3 g. of potassium and 40 ml. of anhydrous ter-butanol).

A slow stream of perchloryl fluoride was introduced into the resulting solution for 5 hours at room temperature; the container was then stoppered and kept overnight also at room temperature.

The mixture was cautiously poured into ice water, extracted with ethyl acetate and the organic layer was washed with 10% sodium carbonate solution and then with water to neutral, dried over anhydrous sodium sulfate and the solvent was evaporated under reduced pressure; the residue was chromatographed on a column charged with 20 g. of silica. Recrystallization of the solid fractions from acetone-hexane yielded 16,16-difluoro-3-methoxy-$\Delta^{9(11)}$-dehydroestrone.

*Example III*

A solution of 2.5 g. of the steroid produced in Example II in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. The residue was chromatographed on neutral alumina, thus affording 16,16-difluoro-3-methoxy-9α,11α-oxido $\Delta^{1,3,5(10)}$-estratrien-17-one and 16,16-difluoro-3-methoxy-9β,11β-oxido $\Delta^{1,3,5(10)}$-estratrien-17-one.

*Example IV*

To a solution of 4 g. of 16,16-difluoro-3-methoxy-9β,11β-oxido-$\Delta^{1,3,5(10)}$-estratrien-17-one in 40 cc. of anhydrous chloroform, was added, over a period of 35 minutes, 30 cc. of a 0.45 N solution of dry hydrogen bromide in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 9α-bromo-16,16-difluoro-3-methoxy-$\Delta^{1,3,5(10)}$-estratrien-11β-ol-17-one.

*Example V*

2 g. of the final compound of Example IV in 40 cc. of cold dimethylforamide was added over 15 minutes to a suspension of 5 g. of finely divided calcium carbonate in 15 cc. of refluxing dimethylformamide. The mixture ws refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 16,16-difluoro-3-methoxy-$\Delta^{1,3,5(10),8}$-estratetraen-11β-ol-17-one.

*Example VI*

A solution of 1 g. of the compound obtained in Example V in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 16,16 - difluoro - 3 - methoxy - $\Delta^{1,3,5(10)8}$ - estratetraene-11,17-dione.

*Example VII*

A solution of 5 g. of 16,16-difluoro-3-methoxy $\Delta^{9(11)}$-dehydroestrone in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness. Recrystallization from methylene chloride-hexane afforded 16,16- difluoro - 17α - methyl - 3 - methoxy - $\Delta^{1,3,5(10)9(11)}$-estratetraen-17β-ol.

Example VIII

The final product of Example VII was treated by the procedure described in Example III, thus yielding 16,16-difluoro- 17α-methyl-3-methoxy-9α,11α-oxido-$\Delta^{1,3,5(10)}$-estratrien-17β-ol and 16,16-difluoro-17α-methyl-3-methoxy-9β, 11β-oxido-$\Delta^{1,3,5(10)}$-estratrien-17β-ol.

Example IX

The latter oxide of Example VIII was successively treated by the methods of Examples IV, V and VI, thus respectively yielding 9α-bromo-16,16-difluoro-17α-methyl-3-methoxy-$\Delta^{1,3,5(10)}$-estratriene-11β,17β-diol, 16,16-difluoro-17α-methyl-3-methoxy - $\Delta^{1,3,5(10)8}$ - estratetraene - 11β, 17β-diol, and 16,16-difluoro-17α-methyl - 3 - methoxy-$\Delta^{1,3,5(10),8}$-estratetraene-17β-ol-11-one.

Example X

A solution of 1 g. of 16,16-difluoro-3-methoxy-$\Delta^{9(11)}$-dehydroestrone in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 16,16-difluoro-17α-ethinyl-3-methoxy-$\Delta^{1,3,5(10),9(11)}$-estratetraen-17β-ol.

Example XI

The final product of Example X was treated by the procedure described in Example III, thus affording 16,16-difluoro-17α-ethinyl-3-methoxy-9α-11α-oxido - $\Delta^{1,3,5(10)}$-estratrien-17β-ol and 16,16-difluoro-17α-ethinyl-3-methoxy-9β-11β-oxido-$\Delta^{1,3,5(10)}$-estratrien-17β-ol.

Example XII

The latter oxide of Example XI was successively treated by the procedures described in Examples IV, V and VI, giving respectively, 9α-bromo-16,16-difluoro-17α-ethinyl-3-methoxy-$\Delta^{1,3,5(10)}$-estratrien-11β,17β-diol, 16,16-difluoro-17α-ethinyl-3-methoxy-$\Delta^{1,3,5(10),8}$ - estratetraene - 11β,17β-diol, and 16,16-difluoro-17α-ethinyl-3-methoxy-$\Delta^{1,3,5(10),8}$-estratetraene-17β-ol-11-one.

Example XIII

A solution of 1 g. of 16,16-difluoro-17α-ethinyl-3-methoxy-$\Delta^{1,3,5(10),8}$-estratetraen-17β-ol-11-one in 40 cc. of pyridine was hydogenated at 25° C. and 570 mm. in the presence of 400 mg. of pre-hydrogenated 2% palladium calcium carbonate catalyst.

When 1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 16,16-difluoro-17α-vinyl-3-methoxy-$\Delta^{1,3,5(10),8}$-estratetraen-17β-ol-11-one.

By the same procedure, there were treated 16,16-difluoro-17α-ethinyl-3-methoxy-9β,11β - oxido - $\Delta^{1,3,5(10)}$-estratrien-17β-ol and 16,16-difluoro-17α-ethinyl-3-methoxy-$\Delta^{1,3,5(10),8}$-estratetraene-11β,17β-diol, yielding respectively: 16,16-difluoro-17α-vinyl-3 - methoxy - 9β,11β - oxido-$\Delta^{1,3,5(10)}$-estratrien-17β-ol and 16,16-difluoro-17α-vinyl-3-methoxy-$\Delta^{1,3,5(10),8}$-estratetraene-11β,17β-diol.

Example XIV

A solution of 1 g. of sodium borohydride in 3 cc. of water was added to an ice-cooled solution of 1 g. of 16,16-difluoro-3-methoxy-$\Delta^{1,3,5(10),8}$-estratetraen - 11β - ol-17-one in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 16,16-difluoro-3-methoxy-$\Delta^{1,3,5(10),8}$-estratetraene-11β,17β-diol.

Example XV

A mixture of 1 g. of the final product of Example XIV, 4 cc. of pyridine and 2 cc. of acetic anhydride was kept at 0° C. overnight, poured into ice water, the formed precipitate was filtered, washed with water and dried. Crystallization from acetone-hexane gave the 17-acetate of 16,16-difluoro-3-methoxy-$\Delta^{1,3,5(10),8}$ - estratetraene - 11β,-17β-diol.

The latter compound was treated in accordance with Example VI, thus yielding the 17-acetate of 16,16-difluoro-3-methoxy-$\Delta^{1,3,5(10),8}$-estratetraen-17β-ol-11-one.

Example XVI

To a solution of 5 g. of 16,16-difluoro-17α-methyl-3-methoxy-$\Delta^{1,3,5(10),8}$-estratetraen-17β-ol-11-one in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the propionate of 16,16-difluoro-17α-methyl-3-methoxy-$\Delta^{1,3,5(10),8}$-estratetraen-17β-ol-11-one.

Following the above procedure were treated 16,16-difluoro - 17α - ethinyl - 3 - methoxy - $\Delta^{1,3,5(10),8}$ - estratetraen-17β-ol-11-one, and 16,16-difluoro-17α-vinyl-3-methoxy-$\Delta^{1,3,5(10),8}$-estratetraen-17β-ol-11-one, thus affording the corresponding propionates.

Example XVII

The starting compounds of Example XVI were treated in accordance with that example, but using caproic anhydride and cyclpentylpropionic anhydride, instead of propionic anhydride, thus affording the corresponding caproates and cyclopentylpropionates of said starting compounds.

Example XVIII $\Delta^{9(11)}$-dehydroestrone, (Magerlein et al., op. cit.) was successively treated in accordance with Examples I, II and III, yielding respectively, 16-hydroxymethylene-$\Delta^{9(11)}$-dehydroestrone, 16,16-difluoro-$\Delta^{9(11)}$-dehydroestrone, and finally, 16,16-difluoro-9α,11α-oxido-$\Delta^{1,3,5(10)}$-estratrien-3-ol-18-one, and 16,16-difluoro-9β,11β-oxido-$\Delta^{1,3,5(10)}$-estratrien-3-ol-17-one.

Example XIX 16,16 - difluoro - 9β,11β - oxido - $\Delta^{1,3,5(10)}$ - estratrien-3-ol-17-one was consecutively treated by the methods of Examples IV, V and VI, furnishing respectively, 9α-bromo 16,16 - difluoro - $\Delta^{1,3,5(10)}$ - estratrien - 3,11β-diol - 17 - one, 16,16 - difluoro - $\Delta^{1,3,5(10),8}$ - estratetraen-3,11β-diol-17-one, and 16,16-difluoro-$\Delta^{1,3,5(10),8}$-estratetraen-3-ol-11,17-dione.

Example XX 16,16-difluoro-$\Delta^{9(11)}$-dehydroestrone was treated in accordance with Examples VII and X, thus giving respectively, 16,16 - difluoro - 17α - methyl - $\Delta^{1,3,5(10),9(11)}$-estratetraene-3,17β-diol, and 16,16 - difluoro - 17α - ethinyl-Δ^{1,3,5(10),9(11)}-estratetraene-3,17β-diol.

*Example XXI*

16,16 - fluoro - 17α - methyl - Δ^{1,3,5(10),9(11)} - estratetraene-3,17β-diol was treated in accordance with Example III, thus yielding 16,16-difluoro-17α-methyl-9α,11α-oxide-Δ^{1,3,5(10)}-estratrien-3,17β-diol, and 16,16-difluoro - 17α-methyl-9α,11β-oxido-Δ^{1,3,5(10)}-estratrien-3,17β-diol.

*Example XXII*

The 9β,11β-oxido compound of Example XXI was successively treated in accordance with Examples IV, V and VI, producing respectively 9α-bromo-16,16-difluoro-17α-methyl - Δ^{1,3,5(10)} - estratriene - 3,11β,17β - triol, 16,16-difluoro - 17α - methyl - Δ^{1,3,5(10),8} - estratetraene - 3,11β,17β-triol, and 16,16-difluoro-17α-methyl-Δ^{1,3,5(10),8}-estratetraene-3,17β-diol-11-one.

*Example XXIII*

16,16-difluoro-Δ^{9(11)}-dehydroestreone was treated following the procedure of Example XVI, thus affording the 3-propionate of 16,16-difluoro-Δ^{9(11)}-dehydroestrone.

*Example XXIV*

The final product of Example XXIII was treated in accordance with Example III, thus yielding the propionate of 16,16-difluoro-9α-11α-oxido-Δ^{1,3,5(10)}-estratrien-3-ol-17-one, and the propionate of 16,16-difluoro-9β,11β-oxido-Δ^{1,3,5(10)}-estratrien-3-ol-17-one.

*Example XXV*

The propionate of 16,16-difluoro-9β,11β-oxido-Δ^{1,3,5(10)}-estratrien-3-ol-17-one was consecutively treated by the methods of Examples IV, V and VI, furnishing respectively, the 3-propionate of 9α-bromo-16,16-difluoro-Δ^{1,3,5(10)}-estratrien-3,11β-diol-17-one, the 3-propionate of 16,16 - difluoro - Δ^{1,3,5(10),8} - estratetraen - 3,11β - diol-17-one, and the 3-propionate of 16,16-difluoro-Δ^{1,3,5(10),8}-estratetraen-3-ol-11,17-dione.

*Example XXVI*

The 3-propionate of 16,16-difluoro-Δ^{1,3,5(10),8}-estratetraene-3,11β-diol-17-one was consecutively treated in accordance with Examples XIV, XV and VI, yielding, respectively, the 3-propionate of 16,16-difluoro-Δ^{1,3,5(10),8}-estratetraene - 3,11β,17β - triol, the 3 - propionate - 17-acetate of 16,16-difluoro-Δ^{1,3,5(10),8}-estratetraene-3,11β,17β-triol, and the 3-propionate-17-acetate of 16,16-difluoro-Δ^{1,3,5(10),8}-estratetraene-3,17β-diol-11-one.

*Example XXVII*

16,16 - difluoro - 17α - methyl - Δ^{1,3,5(10),9(11)} - estratetraene-3,17β-diol was treated in accordance with Example XVI, thus affording the dipropionate of 16,16-difluoro-17α - methyl - Δ^{1,3,5(10),9(11)} - estratetraene - 3,17β - diol, which upon treatment by the procedure of Example III furnished the dipropionate of 16,16-difluoro-17α-methyl-9α,11α-oxido-Δ^{1,3,5(10)}-estratriene-3,17β-diol and the dipropionate of 16,16-difluoro-17α-methyl-9β,11β-oxido-Δ^{1,3,5(10)}-estratriene-3,17β-diol.

We claim:

1. A compound of the following formula:

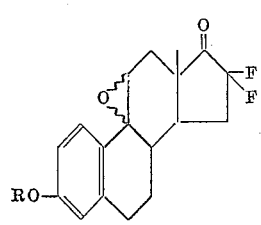

wherein R is a member of the group consisting of hydrogen, lower alkyl and a hydrocarbon carboxylic acyl group of less than 12 carbon atoms.

2. 16,16 - difluoro - 3 - methoxy - 9α,11α - oxido-Δ^{1,3,5(10)}-estratrien-17-one.

3. 16,16 - difluoro - 3 - methoxy - 9β,11β - oxido-Δ^{1,3,5(10)}-estratrien-17-one.

4. A compound of the following formula:

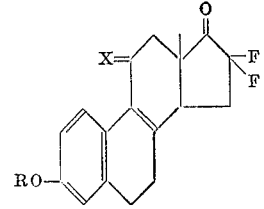

wherein R is selected from the group consisting of hydrogen, lower alkyl and a hydrocarbon carboxylic acyl group of less than 12 carbon atoms; and X is selected from the group consisting of keto and β-hydroxyl.

5. 16,16 - difluoro - 3-methoxy-Δ^{1,3,5(10),8}-estratraen-11β-ol-17-one.

6. 16,16 - difluoro - 3-methoxy-Δ^{1,3,5(10),8}-estratetraene-11,17-dione.

7. A compound of the following formula:

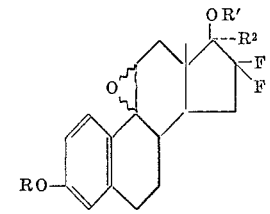

wherein R is a member of the group consisting of hydrogen, lower alkyl and a hydrocarbon carboxylic acyl group of less than 12 carbon atoms; R^1 is selected from the group consisting of hydrogen and a hydrocarbon carboxylic acyl group of less than 12 carbon atoms; and R^2 is a member of the group consisting of hydrogen, lower alkyl, lower alkynyl and lower alkenyl.

8. 16,16 - difluoro-17α-methyl-3-methoxy-9α,11α-oxido-Δ^{1,3,5(10)}-estratrien-17β-ol.

9. 16,16 - difluoro - 17α - methyl - 3-methoxy-9β,11β-oxido-Δ^{1,2,5(10)}-estratrien-17β-ol.

10. 16,16 - difluoro - 17α - ethynyl-3-methoxy-9α,11α-oxido-Δ^{1,3,5(10)}-estratrien-17β-ol.

11. 16,16 - difluoro - 17α - ethynyl-3-methoxy-9β,11β-oxido-Δ^{1,3,5(10)}-estratrien-17β-ol.

12. A compound of the following formula:

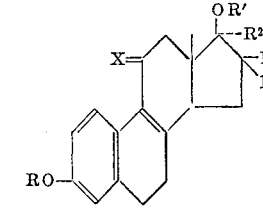

wherein R is selected from the group consisting of hydrogen, lower alkyl and a hydrocarbon carboxylic acyl group of less than 12 carbon atoms; R^1 is a member of the group consisting of hydrogen and a hydrocarbon carboxylic acyl group of less than 12 carbon atoms; R^2 is selected from the group consisting of hydrogen, lower alkyl, lower alkynyl and lower alkenyl and X is a member of the group consisting of keto and β-hydroxyl.

13. 16,16 - difluoro - 17α-methyl-3-methoxy-Δ^{1,3,5(10),8}-estratetraene-11β,17β-diol.

14. 16,16 - difluoro-17α-ethynyl-3-methoxy-Δ^{1,3,5(10),8}-estratetraene-11β,17β-diol.

15. 16,16 - difluoro - 17α-methyl-3-methoxy-$\Delta^{1,3,5(10),8}$-estratetraen-17β-ol-11-one.

16. 16,16 - difluoro-17α-ethynyl-3-methoxy-$\Delta^{1,3,5(10),8}$-estratetraen-17β-ol-11-one.

17. 16,16 - difluoro - 17α - vinyl-3-methoxy-$\Delta^{1,3,5(10),8}$-estratetraen-17β-ol-11-one.

18. 16,16 - difluoro-3-methoxy-$\Delta^{1,3,5(10),8}$-estratetraene-11β,17β-diol.

19. The 17-acetate of 16,16 - difluoro - 3 - methoxy-$\Delta^{1,3,5(10),8}$-estratetraen-17β-ol-11-one.

No references cited.